Figure 1:
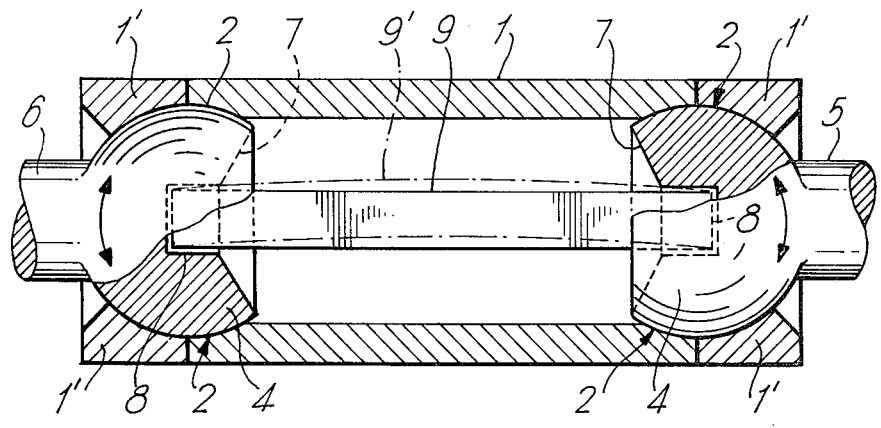

United States Patent [19]

Kimball

[11] 4,151,728

[45] May 1, 1979

[54] UNIVERSAL COUPLING

[76] Inventor: Brian E. Kimball, 76 Third St. N.E., Weyburn, Sask., Canada

[21] Appl. No.: 869,595

[22] Filed: Jan. 16, 1978

[51] Int. Cl.² .......................... F16D 3/02; F16D 3/04
[52] U.S. Cl. ........................................ 64/7; 64/32 R; 64/3; 64/2 P; 64/15 B
[58] Field of Search ............... 64/7, 3, 32, 2 P, 15 B; 403/56

[56] References Cited

U.S. PATENT DOCUMENTS

| | | | |
|---|---|---|---|
| 1,645,247 | 10/1927 | Loock | 64/32 R |
| 2,015,688 | 10/1935 | Ney | 64/3 |
| 2,386,630 | 10/1945 | O'Malley | 64/7 |
| 2,462,574 | 2/1949 | Wallace | 64/32 R |
| 2,796,749 | 6/1957 | Warner | 64/32 R |
| 3,054,275 | 9/1962 | Ongaro | 64/9 R |
| 3,124,971 | 3/1964 | Peters | 403/56 |
| 3,197,552 | 7/1965 | Flair | 403/56 |
| 3,367,616 | 2/1968 | Bausch | 403/56 |
| 3,406,534 | 10/1968 | Chapper | 64/7 |
| 4,114,403 | 9/1978 | Grey | 64/15 B |

OTHER PUBLICATIONS

Bayer et al., *IBM Technical Disclosure Bulletin*, vol. 17, No. 3, pp. 849-850, Aug. 1974.

*Primary Examiner*—Charles J. Myhre
*Assistant Examiner*—R. C. Turner
*Attorney, Agent, or Firm*—Browdy and Neimark

[57] ABSTRACT

A universal coupling or joint is disclosed. The coupling comprises a hollow elongate casing having spherical sockets adjacent each end thereof, and a driving shaft having a spherical ball provided at one end positioned within one spherical socket, and a driven shaft having a spherical ball provided at one end positioned within the other spherical socket, and a torque transmitting member extending between the said spherical balls and in direct rotational engagement therewith. The coupling of the invention minimizes entry of abrasive grit and dirt into the bearing surfaces thus enabling long life and durability, and the provision of the outer casing which is not directly driven by the driven members of the unit provides a safety factor not before possible.

9 Claims, 2 Drawing Figures

UNIVERSAL COUPLING

The present invention relates to a universal coupling and particularly to a universal coupling assembly, which is highly resistant to deterioration and failure through the entry of abrasive grit and dirt and which provides an increased safety factor.

The universal coupling of the present invention has as an integral component thereof an outer casing which effectively minimizes entry of abrasive grit and particles into the contacting bearing surfaces of the coupling and the casing also provides a protective covering as it is not positively driven by the driving members of the couplings.

DISCUSSION OF PRIOR DEVICES

In known universal joints and couplings, pins are provided in the form of a cross with the shaft being coupled and secured to the cross-member by yokes as is well known. Assemblies such as this are open to the ingress of abrasive dirt and particles with the result that the critical bearing surfaces of the coupling are subject to deterioration and failure as a result of the bearing surfaces being scratched and worn. Additionally, in these universal joints and couplings as known, a risk factor is always present through a workman as loose clothing can easily become entangled in a rotating coupling with results which can at times be fatal to the workman.

ADVANTAGES AND OBJECTS OF THE PRESENT INVENTION

The present coupling overcomes these disadvantages and it is the principle object of the invention to provide a coupling which is long lasting and durable and which provides a safety factor not present in known assemblies inasmuch as the outer casing of the present assembly is independently rotatable apart from the driving and driven members of the assembly.

Although the coupling of the present invention is primarily intended for use with industrial equipment such as rock weeders, and in underground situations where abrasive grit and dirt particles are prevalent, it will also be appreciated that the inventive concept is applicable in all instances where universal couplings is used such as in automobiles and trucks and other vehicles.

BRIEF DESCRIPTION OF ACCOMPANYING DRAWINGS

Figure 2:
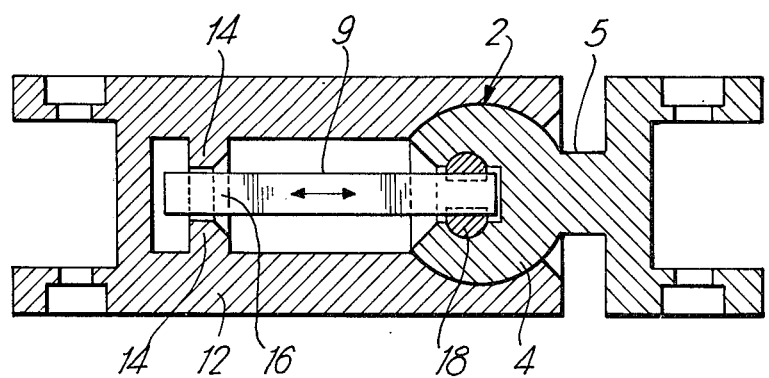

FIG. 1 illustrates in cross-sectional side view one embodiment of the present invention; and FIG. 2 illustrates in side cross-sectional view a still further embodiment of the present invention.

SPECIFIC DESCRIPTION OF DRAWINGS

With reference now to attached FIG. 1, numeral 1 indicates a casing which may be made of metal or other similar material and which is elongate and hollow in form. Adjacent each end of the casing 1 sockets 2 of generally spherical configuration are provided. The ends of the casing 1 may conveniently be provided with end pieces or caps 1' to facilitate assembly of the device. The caps 1' may be held in position by bolts passing through the caps and into the casing or by other suitable means. Positioned within each of the spherical sockets 2 is a generally semi-cylindrical ball 4, with each ball 4 being integrally secured to a shaft. For purposes of better understanding and with reference to attached FIG. 1 shaft 5 may be considered as being a driving shaft and shaft 5 as being a driven shaft. Although not specifically shown in the drawings, the outer ends of the shaft 5 and shaft 6 are provided with suitable means for coupling the shafts to further rotatable members. The interior surfaces of the balls 4 are provided with generally conical recesses 7, and each ball is furthermore provided with a recess 8 which in a preferred construction is square in cross-section. Extending between each of the balls is a torque transferring member 9 which in a preferred construction is of square cross-section, and the opposed ends of the torque transferring member 9 are received within the recesses 8 provided in each ball member. Shaft 5 and ball 4 and torque transferring member 9 and ball 4 and shaft 6 are in direct rotational engagement with each other and it will be appreciated that the imparting of a rotational drive to shaft 5 will result in a corresponding rotational drive in shaft 6. The balls 4 are free to rotate within the casing 1, and when in use, rotation of shafts 5 and 6 will result in some rotation of casing 1, unless the casing 1 is restrained from movement. However, there is no direct rotational engagement between the driving components and the casing 1 with the result that any clothing or other objects contacting casing 1 will simply result in a cessation of the rotation of casing 1 with no damage having been done.

When acting as a universal joint, that is, when the axis of shafts 5 and 6 are not coaxial, the torque transmitting member 9 will bend (as shown at 9' in FIG. 1) to a degree to compensate for the difference of angles between shafts 5 and 6. As each of the shafts 5 and 6 is capable of movement to a position at 45° to the axis of the casing 1, then it is possible to achieve a universal coupling effect of 90° dependent upon the inner diameter of casing 1 and the material from which the torque transmitting member is made. As will be appreciated from the attached FIG. 1, the openings at the ends of the casing 1 are provided in a conical configuration to enable each of the shafts to rotate to a position at 45° with respect to the axis of the casing 1.

If desired, the jacket 1 may be provided with a suitable grease fitting or fittings to enable lubricant to be supplied to the bearing surfaces between the balls 4 and the casing 1 and caps 1'.

Also, and as indicated above, at least the ends of the torque transmitting member 9 are preferably square in cross-section and these ends are received within balls 4 having recesses 8 which are also of square cross-section. However, it will be appreciated that the ends of the torque transmitting member 9 may be of any desired configuration with the balls 4 being provided with recesses 8 of similar complementary configuration. For example, the ends of the torque transmitting member 9 may be splined to mesh with a splined interior of the recesses 8, or the arrangement provided could be either as a round spline, or as a bevelled gear or the like. The use of a key (or keys) 18 between the member 9 and a ball 4 is shown by way of example in FIG. 2. Additionally, and while not specifically shown in the drawings, the casing 1 could be provided with ball bearing assemblies to facilitate movement of the balls 4 in the casing.

FIG. 2 illustrates a further embodiment of the present invention. The casing 12 as shown in FIG. 2 is provided at one end with a spherical socket 2 which receives a ball 4 secured to a shaft 5 in the same manner as discussed in respect of FIG. 1. However, in the FIG. 2 embodiment, the torque transmitting member 9 is secured against axial rotation with respect to the casing 12 by means of shoulders or abutments 14 as shown. In the FIG. 2 embodiment, the torque transmitting member 9 is free to move infinitesimally in the direction shown by the double ended arrow 16 to enable compensation for bowing and straightening of the torque transmitting member during use.

Although only two specific embodiments of the present invention have been described and illustrated, it will be appreciated that other possible variations are possible without departing from the spirit and scope of the present invention.

As indicated above, the torque transmitting member is preferably polygonal such as for example hexagonal or octagonal in cross-section.

I claim:

1. A universal coupling or joint comprising a hollow elongate casing having sperical sockets provided adjacent each end thereof and a driving shaft having a semi-spherical ball with a generally spherical bearing surface provided at one end positioned within one spherical socket, and a driven shaft having a semi-spherical ball having a generally spherical bearing surface provided at one end positioned within the other generally spherical socket, and elongate torque transmitting member extending between the semi-spherical balls and in direct rotational engagement therewith, the elongate torque transmitting member being spaced from inner surfaces of the hollow elongate casing, and being adapted to bend to transmit driving force from the driving shaft to the driven shaft when the driving and driven shafts are respectively oriented in noncoaxial relationship.

2. A coupling according to claim 1, wherein at least the ends of the torque transmitting member are square in cross-section, the ends of the torque transmitting member being received in recesses of square cross-section provided in the semi-spherical balls.

3. A coupling according to claim 1, the ends of the torque transmitting member being received in recesses provided in the semi-spherical balls.

4. A coupling according to claim 3, the ends of the torque transmitting member being splined for engagement with splined recesses provided in the semi-spherical ball.

5. A coupling according to claim 1, including grease-fittings in casing enabling lubrication of the said bearing surfaces.

6. A coupling according to claim 1, including ball bearings lining the said sockets facilitating rotation of the semi-spherical balls therein.

7. A universal coupling according to claim 1, the inner surface of each ball being additionally provided with a recess of generally conical configuration.

8. A coupling according to claim 1, wherein the ends of the casing are bevelled in conical configuration.

9. A coupling according to claim 1, wherein the torque transmitting member is hexagonal or octagonal in cross-section.

* * * * *